H. L. BETTEN.
APPARATUS FOR WITHDRAWING STUMPS.
APPLICATION FILED FEB. 16, 1914.
1,101,899.
Patented June 30, 1914.
2 SHEETS—SHEET 1.
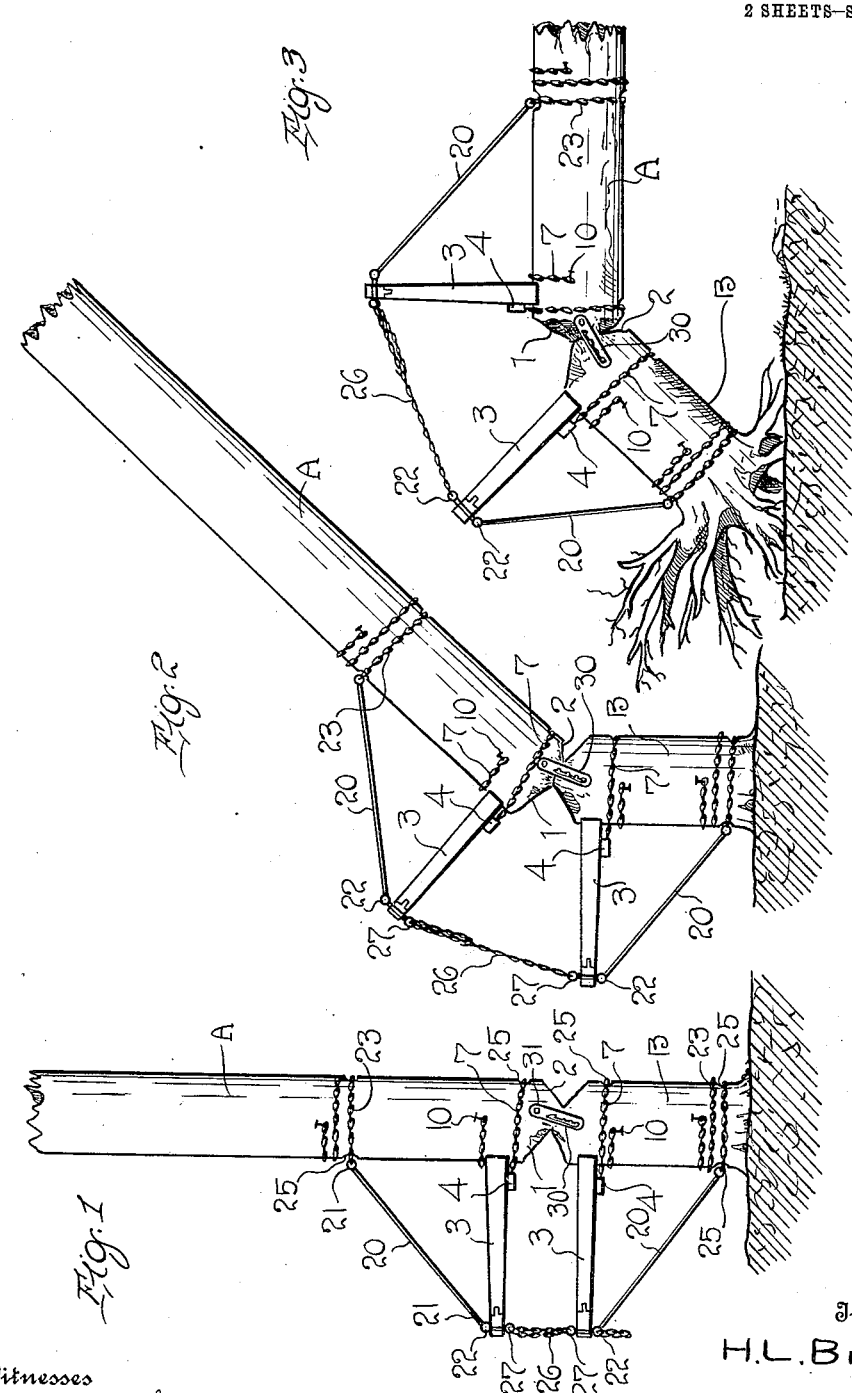
Inventor
H.L. Betten
By Watson E. Coleman
Attorney
Witnesses
Robert M. Sutphen
A. M. Hind

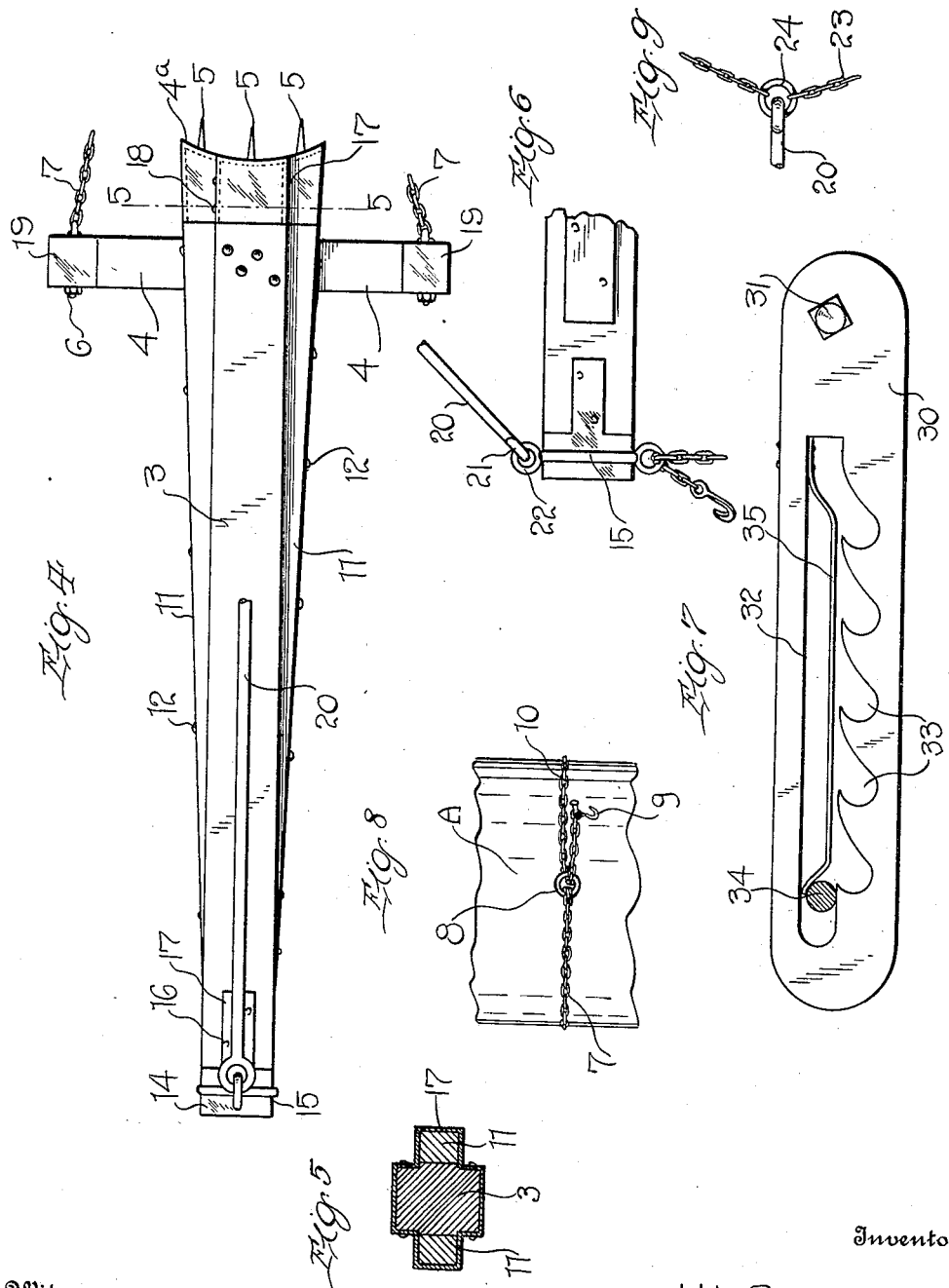

UNITED STATES PATENT OFFICE.

HENRY L. BETTEN, OF ALAMEDA, CALIFORNIA.

APPARATUS FOR WITHDRAWING STUMPS.

1,101,899.  Specification of Letters Patent.  Patented June 30, 1914.

Application filed February 16, 1914. Serial No. 819,046.

*To all whom it may concern:*

Be it known that I, HENRY L. BETTEN, a citizen of the United States, residing at Alameda, in the county of Alameda and State of California, have invented certain new and useful Improvements in Apparatus for Withdrawing Stumps, of which the following is a specification, reference being had to the accompanying drawings.

This invention relates to certain improvements in apparatus for withdrawing stumps and has relation more particularly to a device of this character which is adapted to operate in a substantially automatic manner; and the object of the invention is to provide a device of this general character wherein the leverage offered by the falling tree trunk is employed to withdraw the stump.

It is also an object to provide an apparatus of this general type having means of a novel and improved character wherein the stump is adapted to serve as a fulcrum for the falling trunk and wherein the leverage strain afforded by the falling trunk is not imparted to the stump to withdraw the same until after the trunk has fallen a predetermined distance.

The invention consists in the details of construction and in the combination and arrangement of the several parts whereby certain important advantages are attained and the device is rendered simpler, less expensive and otherwise more convenient and advantageous for use, all as will be hereinafter more fully set forth.

Figure 1 is a view in elevation of the lower portion of a tree with my improved apparatus applied thereto in initial position; Fig. 2 is a view somewhat similar to Fig. 1, but illustrating a severed trunk in that position of its fall when the leverage strain thereof is about to be applied to the stump; Fig. 3 is a view similar to the preceding views but illustrating the stump as extracted; Fig. 4 is a top plan view enlarged, with parts in section, of a portion of the apparatus herein disclosed; Fig. 5 is a sectional view taken on the line 5—5 of Fig. 4; Fig. 6 is a fragmentary view in side elevation of the outer extremity of the member illustrated in Fig. 4; Fig. 7 is a view in elevation of the link comprised in the present embodiment of my invention, the coacting lag screw, herein disclosed, being shown in section; Fig. 8 is a view in elevation of a fragment of a tree trunk, showing the means herein embodied for connecting certain of the parts of my improved apparatus, as herein disclosed, to such trunk; and Fig. 9 is a fragmentary view of the outer end of one of the rods coacting with a brace member, as herein embodied.

As disclosed in the accompanying drawings, A denotes the trunk of a tree and B the stump thereof to which my improved apparatus is shown applied, such trunk A being herein shown as separated from the stump by the upper and lower cuts 1 and 2, respectively, as is believed to be clearly shown in Figs. 1, 2 and 3 of the drawings, and whereby the trunk A will be caused to fall in the direction indicated by Figs. 2 and 3.

After the upper cut 1 has been made, with a view of dropping the tree in a predetermined direction, the braces 3 of predetermined length are operatively connected to the stump or butt B and the trunk A in close proximity to the cut and projected outwardly therefrom in substantially a horizontal plane and disposed in a direction substantially opposite to that in which the trunk A is adapted to fall. As herein disclosed, the inner extremities 4$^a$ of each of the braces 3 are concaved, as is particularly illustrated in Fig. 4, and such concaved ends are provided with the spurs or penetrating members 5 adapted to be forced within either the trunk A or the stump or butt B by tapping the outer extremities of such braces with a suitable implement.

Adjacent its concaved end, each of the braces 3 is provided with a cross bar 4 of predetermined length and to each extremity of which is secured, as indicated at 6, an end portion of a flexible member 7, herein set forth as a linked chain. The flexible members 7 of each of the cross arms 4 are of different lengths and the shorter member thereof terminates in an eye 8, as is particularly shown in Fig. 8, through which is adapted to be threaded the outer or free extremity of the second member 7, such second member terminating in a hook 9 which may be caused to engage with a suitable link comprised in such member after the slack of the member 7 has been properly taken up or, if preferred and as illustrated in Fig. 8, a spike 10 or the like may be driven through one of the outer links, preferably the last one.

While the brace members 3 may be formed as desired, I prefer to employ the arrangement disclosed in the accompanying drawings, wherein each of such brace members is provided on its opposite side faces with the reinforcing fins 11 suitably secured thereto by bolts 12 in a manner which is believed to be self-evident, such fins being tapered outwardly, as is clearly shown in Fig. 4 and secured to the outer extremity of such brace member 3 is a metallic shoe 14 provided on its periphery with the outstanding collar 15, such shoe being operatively connected to the brace member 3 through the medium of the bolts 16 or the like directed through such member and through the rearwardly disposed extensions 17 formed on the collar. It is to be observed that the spikes or penetrating members 5 are carried by a suitable casting 16 fitted over the inner extremity of each of the brace members 3 and of requisite configuration and being maintained against displacement through the medium of the bolts 18 or the like; and it is also to be observed that the spikes or penetrating members 5 are of such a length as to penetrate through the bark of the tree to the solid wood thereof and thus assure against slipping or displacement of the contacting ends of the brace members 3. It is also to be observed that the extremities of the cross arms 4 are incased in metallic castings 19, for reasons which are believed to be obvious.

To maintain the brace members 3 against vertical movement, I find it of advantage to provide the rods 20 terminating at their extremities in the eyes 21, whereby hinged connection may be had with the outer extremity of a brace member 3, such engagement being afforded by an eye 22 suitably produced on the collar 15, the rod 20 coacting with the uppermost brace member 3 being positioned thereabove while the second rod is positioned below the lower brace member 3, as is clearly shown in Figs. 1, 2 and 3. The eyes 21 at the outer or free extremities of the rod 20 are adapted to be engaged with a flexible member 23 at a point intermediate its length, such member being herein disclosed as a linked chain having one of its links 24 enlarged, whereby proper engagement may be had with the rod 20, as is particularly illustrated in Fig. 8. Each of the flexible members 23 is adapted to be engaged with the tree in substantially the same manner as has been set forth relative to a flexible connection 7 and as particularly illustrated in Fig. 8 and a further detail thereof is therefore believed to be unnecessary. In practice, I have found it of advantage to notch the tree, as indicated at 25, in the front and back to accommodate the various flexible members whereby it will be seen that such members are prevented from slipping when the requisite strain is imposed thereupon to take up the slack therein. After the members, hereinbefore described, have been assembled the outer extremities of the brace rods 3 are connected by a flexible member 26, herein shown as also comprising a linked chain and being connected by the opposed rings or eyes 27 carried by the flanges 15. I prefer that one extremity of the flexible member 26 be fixedly connected with the eye 27 of the lowermost members 3, with the opposite extremity of such member threaded through the eye 27, whereby it will be seen that such connection as afforded by the member 26 may be adjusted as the necessities of practice require. It will also be seen, by particular reference to Fig. 1, that initially the flexible member 26 is of a length in predetermined excess of the distance between the brace members 3 so that the severed trunk A will fall a predetermined distance before the requisite leverage strain is imposed upon the stump or butt B, as is believed to be set forth particularly in Figs. 2 and 3.

It is thought to be obvious that the length of the connection, afforded by the member 26, may be adjusted by having the free extremity of such member terminating in a hook 28 capable of engagement with the different links of such member in a manner which is believed to be self-evident. The operation of the device is believed to be self-evident without a detail thereof although I think it well to state that I prefer that the flexible connection be so adjusted as to have the leverage action or strain transferred to the stump when the trunk A has fallen or toppled to an angle of about forty-five degrees out of the perpendicular, as is particularly indicated in Fig. 2.

It will be observed that in the movement or falling of the trunk A, the stump B serves as a fulcrum thereof. It is to be observed that the cuts 1 and 2, as herein disclosed, do not entirely sever the trunk A from the butt thereof and in practice it has been found that a breaking of the wood fiber between the cuts occurs only after the trunk has fallen from fifty-five to sixty-five degrees from the perpendicular. By this it will be perceived that the uncut portions of the tree will serve to prevent twisting of the trunk but in order to provide a safeguard against any possible twisting, I find in practice that it is particularly advantageous to provide the link members 30 disposed at opposite sides of the tree and bridging the space between the cuts, as is clearly shown in Figs. 1, 2 and 3, one of such links being particularly illustrated in Fig. 7. The upper extremity of each of the links is pivotally engaged with the trunk A by a lag screw 31 or the like, while the opposite or lower extremity of such link has an elongated longitudinally disposed slot 32, one edge of which being provided with a plurality of notches, as is particularly indicated at 33 in Fig. 7, and through such slot 32 projects a second lag screw 34 suitably connected with a second stump or butt B of the tree. To the upper extremity of the slot 32 and connected to the wall thereof opposite to the notches 33 is a spring member 35 extending along and within the slot 32 and having its free extremity directed across the lag screw 34 whereby it will be seen that as the trunk A topples or falls the lag screw 34 will be caused, by the action of the spring 35, to enter in the different notches 33 of the link, whereby such trunk A will be effectively held against twisting motion as such link will serve to automatically compensate for any undue twisting which might otherwise occur between the trunk A and the stump or butt B.

From the foregoing description, it is thought to be obvious that an apparatus for withdrawing stumps constructed in accordance with an embodiment of my invention is of an extremely simple and comparatively inexpensive nature and is particularly well adapted for use by reason of the convenience and facility with which it may be assembled into operative position and the substantially automatic manner in which it performs its functions and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In a stump extracting apparatus, means adapted to engage a tree trunk, means adapted to engage the stump of the tree, a connection adapted to connect the parts after the trunk is partly severed from the stump, and a compensating link independent of the connection connected to the stump and trunk and intersecting the line of cut.

2. In a stump extracting apparatus, a brace rod having one extremity adapted to abut the trunk, means for anchoring the rod to the trunk, a second brace rod having one extremity adapted to abut the stump, means for anchoring the rod to the stump, both of such rods being initially disposed in substantial parallelism, and a flexible connection between the outer extremities of such brace rods, such connection being of a length in excess of the initial distance between such extremities.

3. In a stump extracting apparatus, a brace rod, having one extremity adapted to abut the trunk, means for anchoring the rod to the trunk, a second brace rod having one extremity adapted to abut the stump, means for anchoring said second rod to the stump, both of such rods being initially disposed in substantial parallelism, a flexible connection between the outer extremities of such brace rods, such connection being of a length in excess of the initial distance between such extremities, penetrating means carried by the contacting ends of the brace members for engaging the trunk and stump and a connection between the outer ends of the parallel brace rods and the tree.

4. In a stump extracting apparatus, means adapted to engage a tree trunk, means adapted to engage the stump of the tree, a connection adapted to connect the parts after the trunk is partly severed from the stump, a compensating link pivotally engaged at one extremity to the tree and adapted to intersect the line of cut, the opposite extremity of the link being provided with an elongated slot, one wall thereof being provided with a series of notches, an elongated flat spring member secured at one extremity to the opposite wall of the slot and overlying the notches, and an anchoring member directed through the slot and adapted to engage the tree and interpose between the notched wall of the slot and the spring.

5. In a stump extracting apparatus, a brace rod having one extremity adapted to abut the trunk, a second brace rod having one extremity adapted to abut the stump, both of said rods being inwardly disposed in substantial parallelism, a flexible connection between the outer extremities of said brace members, said connection being of a length in excess of the initial distance between said extremities, cross arms carried by the brace members adjacent their inner extremities, flexible members carried by said cross arms and coacting with the stump and trunk for holding said brace members in operative position, and a connection between the outer ends of the parallel brace rods and the tree.

In testimony whereof I hereunto affix my signature in the presence of two witnesses.

HENRY L. BETTEN.

Witnesses:
W. J. ROGERS,
ETHEL E. BETTEN.

Copies of this patent may be obtained for five cents each, by addressing the "Commissioner of Patents, Washington, D. C."